United States Patent
Yukuta et al.

[11] 3,890,293
[45] June 17, 1975

[54] METHOD OF PRODUCING ALDEHYDE FUNCTIONAL MULTI-COMPONENT COPOLYMERS

[75] Inventors: Toshio Yukuta; Takashi Ohashi; Yoshiko Oguri, all of Tokyo, Japan

[73] Assignee: Bridgestone Tire Company Limited, Kyobashi, Japan

[22] Filed: May 23, 1972

[21] Appl. No.: 256,120

[30] Foreign Application Priority Data
June 1, 1971 Japan............ 46-37479

[52] U.S. Cl............ 260/80.78; 260/88.2 S; 260/877
[51] Int. Cl................. C08f 27/22; C08f 27/24
[58] Field of Search............ 260/877, 80.78, 88.2 S

[56] References Cited
UNITED STATES PATENTS

| | | | |
|---|---|---|---|
| 3,271,477 | 9/1966 | Kresge | 260/877 |
| 3,483,173 | 12/1969 | Natta | 260/80.78 |
| 3,585,174 | 6/1971 | Natta | 260/80.78 |

FOREIGN PATENTS OR APPLICATIONS

| | | |
|---|---|---|
| 1,347,881 | 11/1963 | France |
| 1,161,824 | 9/1958 | France |
| 300,783 | 9/1965 | Netherlands |
| 16,911 | 1965 | Japan................. 26/B 11 |

OTHER PUBLICATIONS

Horner and Jungeleit, Annalen, 1955, 591, 138–148
Lorenz and Parks, J. Org. Chem., 1965, 30, 1976–1981.
Pappas et al., J. Org. Chem., 1968, 33, 787–792.
Roberts, John D. and Caserio, Marjorie, pgs. 191–3, Basic Principles of Organic Chemistry, 1964, W. A. Benjamin Inc., Publ.

Primary Examiner—Joseph L. Schofer
Assistant Examiner—A. L. Clingman
Attorney, Agent, or Firm—Stevens, Davis, Miller & Mosher

[57] ABSTRACT

An aldehyde functional multi-component copolymer is produced by subjecting a multi-component copolymer having olefin bond units in the side chain or in the cyclic group in the main chain to ozonolysis and then reducing the resulting mixed peroxides into aldehyde functional groups. The aldehyde functional multi-component copolymer is excellent to be used as base material, compounding agent, processing aid and adhesive in rubber industry.

9 Claims, 3 Drawing Figures

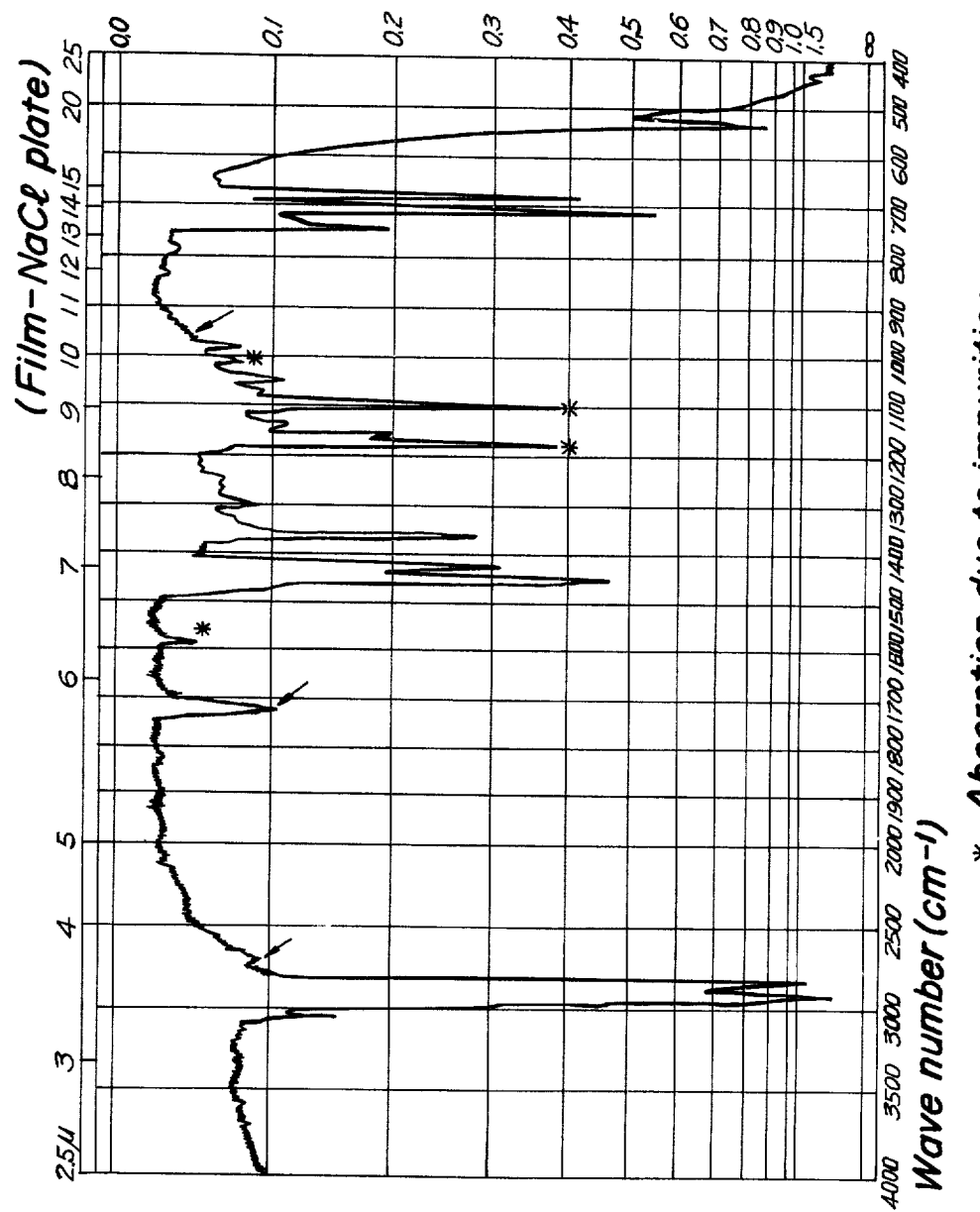

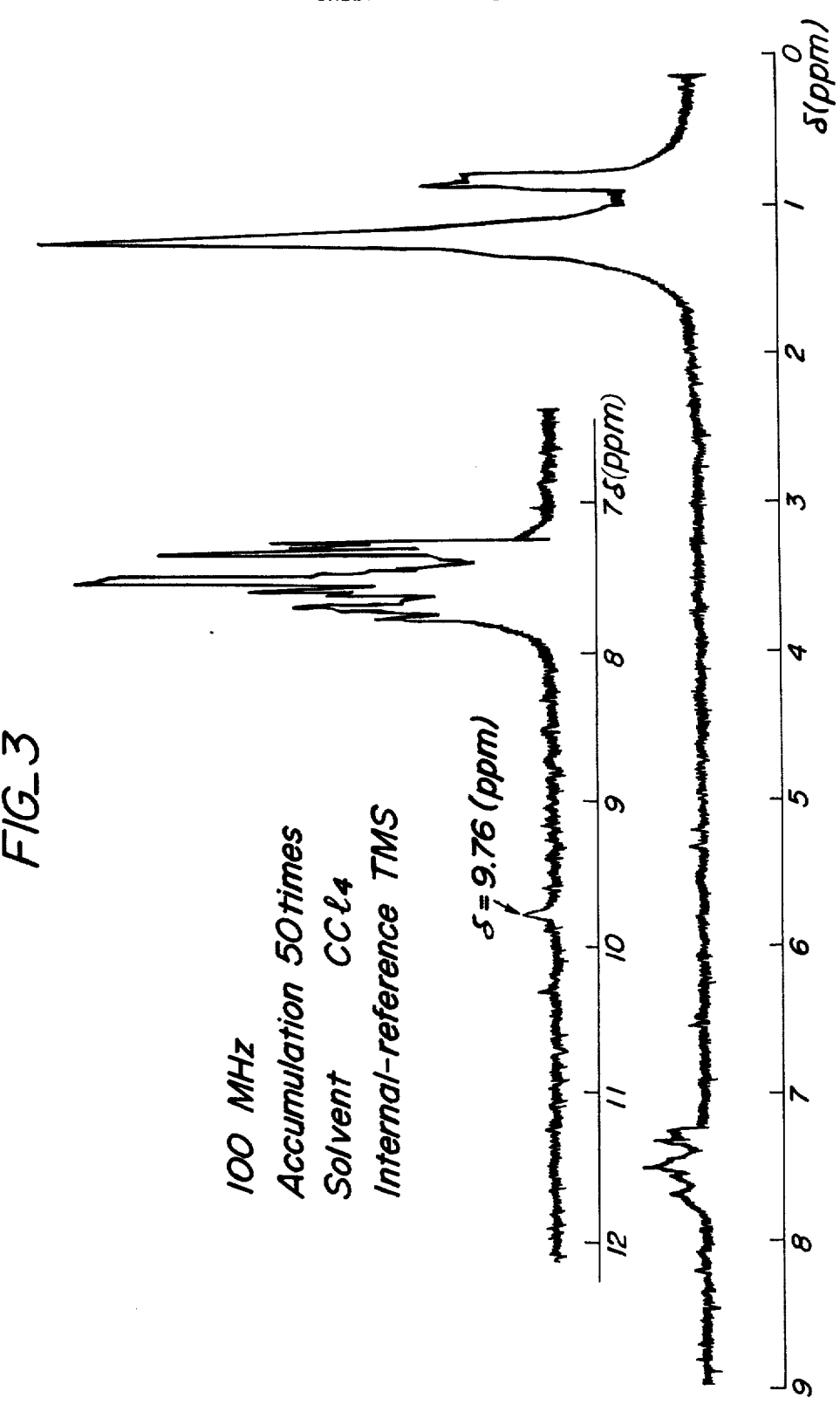

METHOD OF PRODUCING ALDEHYDE FUNCTIONAL MULTI-COMPONENT COPOLYMERS

The present invention relates to a method of producing modified high polymers, wherein in a high polymer having olefin bond units in the side chain or in the cyclic group in the main chain, said olefin bond units are converted into aldehyde functional groups. More particularly, the present invention relates to a method of producing aldehyde functional multi-component copolymers having aldehyde functional groups in the side chain or in the cyclic group in the main chain, which comprises contacting a multi-component copolymer (hereinafter abridged as multi-component copolymer) having olefin bond units in the side chain or in the cyclic group in the main chain, which is prepared from at least two $\alpha,\beta$-unsaturated compounds and at least one non-conjugated diolefin compound, with ozone to effect ozonolysis of the olefin bond units, and then reducing the resulting mixed peroxides with a trivalent phosphorus compound.

Recent progress in the scientific technique demands to develop high polymers having pertinent properties to the use purpose, and high polymers having desired properties have been demanded in elastomers. As the method for developing novel high polymers by modifying well known high polymers, graft or block copolymerization, formation of derivatives by a chemical reaction, and polymer blending have been effected, but desired products have often been found difficult to be obtained by these methods. For example, in the polymer blending method, there is a limitation in view of the compatibility of polymers to be blended, and the development of high polymers is hindered by this defect.

It has recently been found out that ethylene/propylene copolymer has rubbery elasticity, and further the property of said copolymer has been improved by adding non-conjugated diolefin compound to the copolymer as the third component to provide cross-linking reactivity to the copolymer. These ethylene/propylene/-cyclopentadiene or 1,4-hexadiene multi-component copolymers not only have an excellent rubbery elasticity, but also have a high ozone resistance due to absence of olefin bond units in the main chain. However, these multi-component copolymers are still considerably inferior in cross-linking reactivity to general purpose rubbers, such as natural rubber, polyisoprene, polybutadiene and styrene/butadiene copolymer rubber, require vulcanization at high temperature for a long period of time, and are very poor in blendability with the general purpose rubbers. Heretofore, in order to improve the serious drawbacks in these multi-component copolymers, for example, cross-linking reactivity, blendability, tackiness and adhesivity, various processes have been attempted. For example, the following prior arts, wherein the properties of the multi-component copolymers are improved by utilizing the formation of derivatives owing to chemical reaction of olefin bond units present in the side chain or in the cyclic group in the main chain of the multi-component copolymers, have been disclosed.

Use of polyorganohydrosiloxane (Japanese Pat. Application Publication No. 13,525/67), Graft-copolymerization of the copolymer with resin-formable monomer (Japanese Pat. Application Publication No. 16,394/68), Grafting of phosphorus-, sulfur- or arsenic series monofunctional acid (Japanese Pat. Application Publication No. 32,423/69), Formation of natural hardening rubber by means of silane compound (Japanese Pat. Application Publication No. 11,819/70), Introduction of carboxyl groups by the reaction of the copolymer with dibasic- or polybasic acid (Japanese Pat. Application Publication No. 20,305/68 and No. 13,591/70), Reaction of the copolymer with hydrogenated resin and organic peroxide (Japanese Pat. Application Publication No. 30,942/70), Grafting of epoxy groups, hydroxy groups, or maleic acid groups (Japanese Pat. Application Publication No. 26,305/68 and U.S. Pat. No. 3,448,174 specification (1969)), and Bromination of the olefin bond units in the side chain (U.S. Pat. No. 3,524,826 specification (1970)).

Particularly, the following prior arts utilizing the ozonolysis as in the present invention have been disclosed. A method of producing graft copolymers wherein olefin bonds in the side chain of the multi-component copolymer are subjected to ozonolysis and then a grafting reaction is effected in the presence of styrene to graft polystyrene to a multi-component copolymer obtained by the ozonolysis (Japanese Pat. Application Publication No. 16,911/65), and a method of producing high molecular weight carbonyl compounds having carbonyl groups in the side chain by an oxidation with ozone (Japanese Pat. Application Publication No. 16,910/65).

The inventors have already succeeded in the production of aldehyde functional polymers having a molecular weight of 500 to 50,000 and having aldehyde functional groups at least at the both ends of molecule by subjecting a polymer having olefin bond units in the main chain to oxonolysis, and then reducing the resulting product with a trivalent phosphorus compound. The inventors further continued the investigation and reached the present invention. As the polymer having aldehyde functional groups in the side chain, homopolymer and copolymer of acrolein have hitherto been known. However, methods for producing multi-component copolymers having aldehyde functional groups in the side chain have never been known. According to the method of the present invention it has been able to obtain a modified multi-component copolymer having novel properties, which have never been obtained heretofore, from a well-known multi-component copolymer containing a non-conjugated diolefin compound as the third component by converting the olefin bond units into aldehyde functional groups regardless of the kind of the non-conjugated diolefin compound. The thus obtained modified multi-component copolymer of the present invention has novel properties due to the aldehyde functional groups. Accordingly, the modified copolymer is a useful industrial material and can be used as base material for elastomer, base material for oil extended elastomer, compounding ingredient or processing aid for other elastomers, base material of liquid rubber and resin, and adhesive.

The multi-component copolymers to be used in the present invention are produced from at least two α,β-unsaturated compounds and at least one non-conjugated diolefin compound. The α,β-unsaturated compounds are ones having 2 to 8 carbon atoms, such as ethylene, propylene and the like. The non-conjugated diolefin compounds include (a) straight-chain aliphatic dienes, such as 1,4-hexadiene, 1,5-hexadiene, 1,6-octadiene and the like; (b) branched chain aliphatic dienes, such as 5-methyl-1,4-hexadiene, 3,7-dimethyl-1,6-octadiene, 3,7-dimethyl-1,7-octadiene and the like; (c) monocyclic alicyclic dienes, such as 1,4-cyclohexadiene, 1,5-cyclooctadiene, 1,5-cyclododecadiene, 4-vinylcyclohexene, 1-allyl-4-isopropylidenecyclohexane, 3-allylcyclopentene, 4-allylcyclohexene, 1-isopropenyl-4-(4-butenyl)cyclohexane and the like; and (d) polycyclic alicyclic dienes, such as tetrahydroindene, methyltetrahydroindene, dicyclopentadiene, bicyclo-(2,2,1)hepta-2,5-diene, alkenyl-, alkylidene-, cycloalkenyl- and cycloalkylidene-norbornene, such as 5-methylenenorbornene, 5-ethylidenenorbornene, 5-propenylnorbornene, 5-isopropylidenenorbornene, 5-(4-cyclopentenyl)norbornene, 5-cyclohexylidenenorbornene and the like. However, the non-conjugated diolefin compounds are not limited to these dienes.

A preferred multi-component copolymer to be used in the present invention is a terpolymer prepared from ethylene, propylene and a non-conjugated diolefin compound, and is usually called as EPDM. The composition ratio of monomers constituting the EPDM is not particularly limited, and 30 to 85 mol% of ethylene, 15 to 70 mol% of propylene and 1.0 to 10 mol% of a non-conjugated diolefin compound are generally used. Further, the molecular weight of the EPDM is not particularly limited, and liquid EPDM or EPDM having a number average molecular weight of 350,000 is used depending upon the purpose. The preparation method of the EPDM is disclosed in various patent specifications, for example, in U.S. Pat. Nos. 2,933,480, 3,000,866 and 3,093,621 specifications.

It is generally considered that one of the double bonds contained in the molecule of the non-conjugated diolefin compound, which is the third component constituting the EPDM, serves to form a terpolymer of the non-conjugated diolefin compound with ethylene and the other α,β-unsaturated compound, for example, propylene, and another double bond remains in the side chain or in the cyclic group in the main chain and contributes to the unsaturation property and the cross-linking reactivity of the EPDM. The present invention relates to the ozonolysis of the olefin bond remaining in the EPDM molecule and to the reduction of the mixed peroxides obtained by the above ozonolysis into aldehyde functional groups.

The fundamental research of the oxidation reaction of ozone against organic compounds was completed in the beginning of the 20th century by the wide investigation of Harries. Later, a large number of fundamental researches relating to the ozonolysis of double bonds has been reported. Among them, the most commonly supported reaction mechanism in the ozonolysis is the zwitter-ion theory by Criegee (R. Criegee, Rec. Chem. Progr., 18, 111 (1957)), and the reaction mechanism in the zwitter-ion theory is as follows.

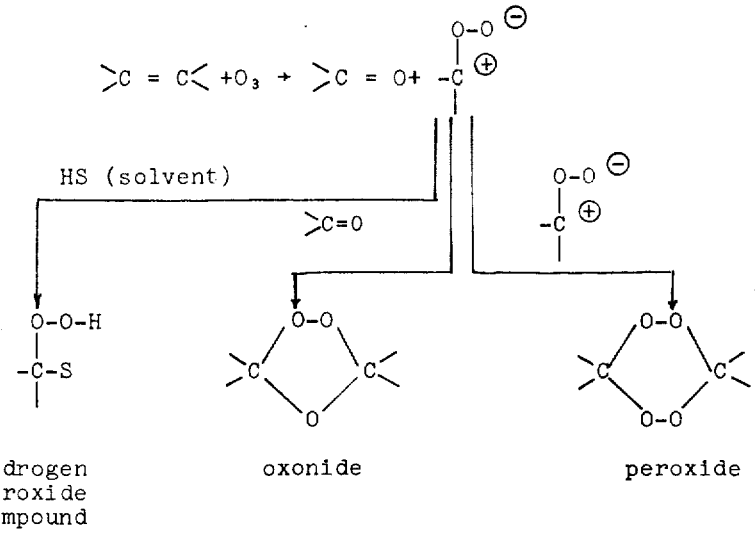

That is, the ozonolysis of double bond produces mixed peroxides of hydrogen peroxide compound, ozonide and peroxide having various mixture ratios of these components depending upon the reaction condition through an unstable zwitter-ion as one intermediate product. The thus formed mixed peroxides can be converted into carboxylic acids, aldehydes, ketones, alcohols and other compounds by oxidation, reduction, hydrolysis or pyrolysis depending upon the purpose. As seen from the above described reaction mechanism, in the ozonolysis of double bond, a compound having a carbonyl group is always produced as another intermediate product regardless of any after-treatment, and if hydrogen atom is bonded to the olefinic carbon of the starting material, the thus formed intermediate compound is aldehyde. The present invention consists in a method of a novel modified multi-component copolymer, wherein all the mixed peroxides obtained by the ozonolysis are converted into substantially aldehyde functional groups by reduction treatment. The ratio of olefin bond units converted into aldehyde functional groups can be selected optionally by regulating amounts of ozone depending upon the purpose, and the ratio is not particularly limited. The resulting aldehyde functional multi-component copolymer preserves physical properties of the multi-component copolymer, which is used as the starting material for said aldehyde functional multi-component copolymer, and accordingly any desired copolymers from liquid low molecular weight moldable copolymer to high molecular weight rubbery elastomer can be produced by selecting the multi-component copolymer to be used.

In the present invention, the starting multi-component copolymer selected depending upon the purpose is dissolved in a proper solvent. As the solvent, mention may be made of those which are inert to ozone, for example, halogenated hydrocarbons, such as carbon tetrachloride, chloroform, methylene chloride and the like; aliphatic or cyclic ethers, such as ether, tetrahydrofuran, dioxane and the like; aromatic hydrocarbons, such as benzene, toluene, mixed xylene and the like; and aliphatic hydrocarbons, such as pentane, hexane, heptane and the like. In a particular case, alcohols, acids, acid anhydrides and esters may be used. However, the solvent is not limited to the above described solvents. Halogenated hydrocarbons are generally preferable, and among them, chloroform and methylene chloride are particularly preferable. The amount of the solvent to be used is optional, but has a relation to the gelation in the ozonolysis, and is preferred to make the concentration of the multi-component copolymer in the solvent as far as low. In general, the concentration of the solution is preferably 0.1 g/100 ml to 50 g/100 ml, and in particular preferably 1 g/100 ml to 10 g/100 ml.

In the present invention, ozone is generally used in the form of a gaseous mixture with a carrier gas selected from air or oxygen. The concentration of ozone in air or in oxygen and the addition amount of ozone can be selected within a wide range. By selecting a condition for generating ozone corresponding to the iodine value of multi-component copolymers, which is measure of the amount of olefin bonds of the copolymers, aldehyde functional multi-component copolymers containing desired amount of aldehyde functional groups can be produced. It is generally preferable to use a gaseous mixture containing ozone in a concentration as low as possible. That is, the amount of ozone is preferably not more than 0.5% and not less than 0.1% by weight based on the carrier gas (that is, not more than 6 mg per 1 l of the carrier gas), and particularly preferably not more than 0.2% and not less than 0.1% by weight based on the carrier gas. The ozonolysis of the multi-component copolymer is carried out by blowing a gaseous mixture containing ozone through a solution of the copolymer in a proper solvent while stirring.

The ozonolysis temperature can be selected optionally within the range of −80° to +60°C, and a preferable temperature range is −30° to +40°C, and particularly preferable temperature range is −15° to +20°C.

The contacting time of the multi-component copolymer with ozone in the ozonolysis has an intimate relation to the amount of olefin bonds contained in the multi-component copolymer and to the desired amount of aldehyde functional groups corresponding to the amount of the olefin bonds. In general, the contacting time is within the range of 0.5 to 24 hours. The mixed peroxides obtained by the above described ozonolysis of the multi-component copolymer are directly subjected to the next reduction treatment.

In the present invention, the mixed peroxides obtained by the ozonolysis of the multi-component copolymer are converted into aldehyde functional groups by the use of a proper reducing agent. The solvents to be used in the reduction reaction may be ones which can be used in the ozonolysis and dissolve the mixed peroxides obtained by the ozonolysis, and can proceed smoothly the reduction reaction. That is, in general, the solvent used in the ozonolysis is directly used in the reduction reaction. Otherwise, the solvent is evaporated after the ozonolysis, and then a proper solvent or a mixed solvent may be used. The inventors have made specifically various investigations with respect to the reducing agents which have been used in conventional reduction methods, and found reducing agents capable of reducing effectively the mixed peroxides obtained by the ozonolysis of the multi-component copolymer into aldehyde functional groups, and reached a method of producing aldehyde functional multi-component copolymers. It has been well known that an excellent method of directly reducing mixed peroxides obtained by the ozonolysis of a low molecular weight compound into aldehyde functional group utilizes the reactivity of nucleophilic reagents, such as nitrogen, phosphorus- and sulfur compounds, with compounds containing active oxygen (Edited by R. L. Augustin, "Oxidation", Technique and Application in Organic Synthesis, Vol. 1, Marcel Dekker, Inc. N.Y., 1969).

The reducing agents to be used in the present invention are trivalent phosphorus compounds. The present invention utilizes the reducing power of trivalent phosphorus atom which is caused when trivalent phosphorus atom is oxidized into pentavalent phosphorus atom by the reaction with active oxygen. As the reducing agent, mention may be made of triphenylphosphine, triethyl phosphite, tris-(dimethylamino)phosphine, and the like. However, these compounds are not limitative. Among these compounds, triphenylphosphine is particularly preferable.

The reducing agent is generally used in an excess amount, that is, in an amount of 0.5 to 3.0 equivalents, preferably 1.2 to 2.0 equivalents, based on the equivalent of the mixed peroxides obtained by the ozonolysis. The reaction temperature and time in the reduction can be selected optionally. In general, the reduction is completed quantitatively when the reaction mixture is left to stand at room temperature for several days, or when the reaction mixture is heated at 50° to 100°C for several hours under stirring and reflux. After completion of the reduction, the solvent is evaporated, and a proper solvent, for example, acetone, which does not dissolve the resulting aldehyde functional multi-component copolymer but dissolves unreacted excess amount of the reducing agent and its oxide, is newly added to the reaction mass to purify the aldehyde functional multi-component copolymer. However, the purification process in the after-treatment can be selected optionally.

For a better understanding of the invention, reference is taken to the accompanying drawings, wherein:

FIG. 2 is an infrared absorption spectrum of the aldehyde functional EPDM terpolymer obtained in Example 1 of the present invention; and FIG. 3 is a nuclear magnetic resonance spectrum due to the aldehyde functional groups of the aldehyde functional EPDM terpolymer obtained in Example 1 of the present invention.

Figure 1:
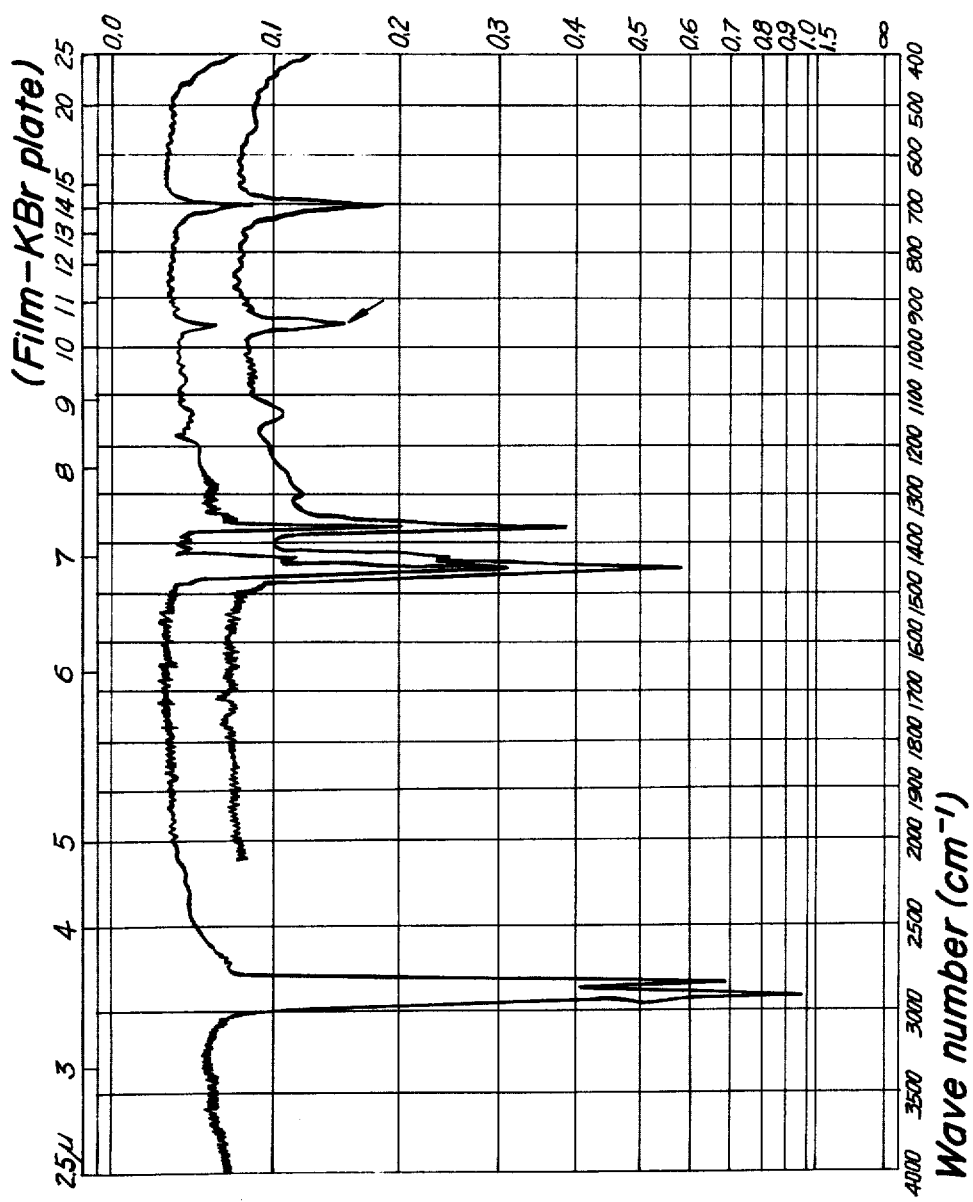
FIG. 1 is an infrared absorption spectrum of the EPDM terpolymer to be used as a starting material in Example 1 of the present invention.

The following example is given in illustration of this invention and is not intended as a limitation thereof.

EXAMPLE 1

In 4 l of chloroform was dissolved 50 g of EPDM Nordel 1070 (trademark of ethylene/propylene/1,4-hexadiene copolymer made by Asahi Kasei K.K., propylene content is 34 mol% and 1,4-hexadiene content is 1.6 mol% based on the total moles of ethylene and propylene, and gel content is 5.8% by weight), and the gel was filtered off by means of a wire gauze. The filtrate was introduced into a 4 neck separable flask of 5 l capacity equipped with a stirrer driven by a motor and a Dewar condenser, and ozone was introduced into the flask through a glass ball filter while the solution was stirred vigorously at room temperature. Ozone was generated from oxygen by means of an O-1-2 type ozone generator made by Nippon Ozone K.K. Ozone was introduced into the flask together with oxygen under such a condition that the flow rate of oxygen was kept at 2.5 l/min, and oxygen having an ozone content of 2 mg/l was flowed during the first 4 hours, and oxygen having an ozone content of 10 mg/l was flowed during the next 40 minutes, whereby a total amount of 2.2 g of ozone was introduced into the flask. After introduction of ozone was completed, the reaction solution was bubbled wholly with dried nitrogen at a rate of 3 l/min for 2 hours to remove residual oxygen. A solution of 12.1 g of triphenylphosphine in 500 ml of chloroform was added to the solution containing mixed peroxides obtained by the above described ozonolysis by means of a dropping funnel equipped with a pressure balancing side tube, and the resulting mass was refluxed for 2 hours at a bath temperature of about 65°C while stirring, and then left to stand until the mass was cooled to room temperature. Major part of the chloroform was evaporated by means of a rotary evaporater to obtain a viscous solution of a crude aldehyde functional EPDM terpolymer in chloroform. Then, the viscous solution was poured into acetone, and after the resulting mass was stirred, the reaction product was precipitated. The precipitate was dried in a conventional manner to obtain 42 g of a purified aldehyde functional EPDM terpolymer.

FIG. 2 shows the infrared absorption spectrum of the thus obtained terpolymer. In this spectrum, an absorption at 952 cm$^{-1}$, which is one of absorptions assigned to the starting EPDM Nordel 1070 and is due to the double bond of 1,4-hexadiene used as the third component (refer to FIG. 1), is diminished, absorptions at 1725 cm$^{-1}$ and 2700 cm$^{-1}$ due to the aldehyde functional groups are newly formed, absorptions at 1710 cm$^{-1}$ and 2650 cm$^{-1}$ inherent to the carboxyl group can be neglected, and an absorption due to the hydroxyl groups is not present. Accordingly, this spectrum proves that aldehyde functional EPDM terpolymers containing substantially only aldehyde functional groups are produced according to the present invention.

FIG. 3 shows the nuclear magnetic resonance spectrum of the same terpolymer. In this spectrum, an absorption inherent to the proton of the aldehyde functional group is present at a chemical shift of δ 9.76 (ppm). Accordingly, this spectrum also proves that aldehyde functional EPDM terpolymers are produced according to the present invention.

What is claimed is:

1. An aldehyde functional multi-component copolymer having aldehyde functional groups in the side chain or in the cyclic group in the main chain, which is obtained
    by subjecting a multi-component copolymer composed of 30–85 mol% of ethylene, 15–70 mol% of propylene and 1–10 mol% of at least one non-conjugated diene compound to an ozonolysis in a solvent
    at a temperature of −80°C to +60°C with ozone mixed with a carrier gas in a concentration of 0.1 to 0.5% by weight based on the weight of the carrier gas, and then
    reducing the resulting mixed peroxides formed by ozonolysis of olefin bond units with a trivalent phosphorus compound in an amount of 0.5 to 3.0 equivalents based on the equivalent of the mixed peroxides.

2. The product as claimed in claim 1, wherein said multi-component copolymer is EPDM composed of ethylene, propylene and 1,4-hexadiene.

3. The product as claimed in claim 1, wherein said solvent is at least one member selected from the group consisting of halogenated hydrocarbons, aliphatic or cyclic ethers, aromatic hydrocarbons and aliphatic hydrocarbons.

4. The product as claimed in claim 1, wherein the ozonolysis temperature is within the range of −30° to +40°C.

5. The product as claimed in claim 1, wherein said trivalent phosphorus compound to be used as a reducing agent is used in an amount of 1.2 to 2.0 equivalents based on the equivalent of the mixed peroxides obtained by the ozonolysis.

6. The product as claimed in claim 1, wherein said trivalent phosphorus compound is selected from the group consisting of triphenylphosphine, triethylphosphite anad tris-(dimethylamino)phosphine.

7. The product as claimed in claim 1, wherein said solvent is at least one member selected from the group consisting of carbon tetrachloride, chloroform and methylene chloride.

8. The product as claimed in claim 1, wherein the ozonolysis temperature is within the range of −15° to +20°C.

9. The product as claimed in claim 5, wherein said trivalent phosphorus compound is triphenylphosphine.

* * * * *